(12) United States Patent　　(10) Patent No.: US 9,598,103 B1
Langenfeld et al.　　(45) Date of Patent: Mar. 21, 2017

(54) STEERABLE TRANSAXLE

(71) Applicant: Hydro-Gear Limited Partnership, Sullivan, IL (US)

(72) Inventors: Thomas J. Langenfeld, Sullivan, IL (US); Ryan S. Buescher, Neoga, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 14/577,441

(22) Filed: Dec. 19, 2014

Related U.S. Application Data

(60) Provisional application No. 61/919,423, filed on Dec. 20, 2013.

(51) Int. Cl.
　　*B62D 5/12*　　(2006.01)
　　*B62D 5/20*　　(2006.01)
　　*B62D 5/22*　　(2006.01)
　　*F15B 15/06*　　(2006.01)

(52) U.S. Cl.
　　CPC ................ *B62D 5/12* (2013.01); *B62D 5/20* (2013.01); *B62D 5/22* (2013.01); *F15B 15/065* (2013.01)

(58) Field of Classification Search
　　CPC .............. B62D 5/12; B62D 5/20; B62D 5/22
　　USPC ........................................................ 180/428
　　See application file for complete search history.

(56) References Cited

U.S. PATENT DOCUMENTS

| | | |
|---|---|---|
| 665,270 A | 1/1901 | Rumely |
| 810,881 A | 1/1906 | Pfouts et al. |
| 849,145 A | 4/1907 | Ledwinka |
| 3,780,504 A | 12/1973 | Haseloff |
| 4,024,695 A | 5/1977 | Haseloff |
| 5,823,284 A | 10/1998 | Hoar et al. |
| 6,926,111 B1 | 8/2005 | Irikura |
| 7,240,759 B2 * | 7/2007 | Uemura ............... B60B 35/001 180/343 |

(Continued)

FOREIGN PATENT DOCUMENTS

| | | |
|---|---|---|
| WO | WO 2012091699 | 7/2012 |
| WO | WO 2012169663 | 12/2012 |

OTHER PUBLICATIONS

U.S. Appl. No. 13/680,543, filed Nov. 19, 2012.
U.S. Appl. No. 14/535,664, filed Nov. 7, 2014.

*Primary Examiner* — Joseph Rocca
*Assistant Examiner* — Michael Stabley
(74) *Attorney, Agent, or Firm* — Neal, Gerber & Eisenberg LLP

(57) ABSTRACT

A vehicle and vehicle drive apparatus having a hydraulic pump and a first and second hydraulic motor, each disposed on a center section, is disclosed. A main housing having a housing cover contains the hydraulic pump and the first and second hydraulic motors, which in turn drive first and second motor shafts, respectively. The first and second motor shafts are enclosed in first and second motor shaft housings, respectively, and the main housing combined with the housing cover and the first and second motor shaft housings form a sealed sump. The main housing has mounted thereon a pinion shaft, a pinion gear and a steering rack meshed with the pinion gear. A first steering arm is rotatably mounted to the first motor shaft housing and connected to the steering rack and a second steering arm is rotatably mounted to the second motor shaft housing and connected to the steering rack.

22 Claims, 15 Drawing Sheets

(56) References Cited

U.S. PATENT DOCUMENTS

| | | |
|---|---|---|
| 7,690,470 B2 | 4/2010 | Iwaki et al. |
| 7,739,870 B2 | 6/2010 | Carlson et al. |
| 7,841,176 B1 | 11/2010 | Langenfeld et al. |
| 7,918,305 B2 | 4/2011 | Scherbring et al. |
| 8,091,672 B2 | 1/2012 | Gutsch et al. |
| 8,393,236 B1 | 3/2013 | Hauser et al. |
| 8,857,554 B1 | 10/2014 | Keller |
| 8,882,119 B2 | 11/2014 | Burns, Jr. |
| 8,919,116 B1 | 12/2014 | Langenfeld et al. |
| 8,950,520 B2 | 2/2015 | Hauser et al. |
| 2002/0125672 A1* | 9/2002 | Lee ................ B62D 3/12 280/93.515 |
| 2006/0042839 A1* | 3/2006 | Iwaki ............... B60K 17/356 180/6.3 |
| 2013/0282212 A1 | 10/2013 | Michael et al. |
| 2013/0282214 A1 | 10/2013 | Goebel et al. |

* cited by examiner

STEERABLE TRANSAXLE

CROSS-REFERENCE TO RELATED APPLICATIONS

This application claims the benefit of U.S. Provisional Patent Application No. 61/919,423, filed on Dec. 20, 2013. The contents of this application is fully incorporated herein by reference.

BACKGROUND OF THE INVENTION

This invention relates to transmissions for vehicles in general and, more particularly, to hydrostatic transmissions for vehicles such as garden tractors and lawn tractors. A hydrostatic transmission (HST) is a well-known type of continuously variable transmission wherein a system of one or more hydraulic pumps transmits energy from an input shaft to one or more hydraulic motors connected to one or more output shafts. The input shaft is typically driven by a prime mover, such as an internal combustion engine or an electric motor. The one or more output shafts are typically connected, either directly or indirectly, to a pair of the vehicle's wheels to propel the vehicle. The hydraulic pumps and motors are contained within a transmission housing filled with hydraulic fluid, which flows in a fluid circuit from pump to motor and back again through hydraulic porting formed in a center section. It is this flow of hydraulic fluid that transmits energy from the pump(s) to the motor(s). Direction of vehicle travel depends on the direction of flow within the hydraulic circuit.

SUMMARY OF THE INVENTION

The present invention teaches a drive apparatus for an application such as a lawn tractor comprising an HST driving steerable wheels in a unitary design. The HST comprises a central section that contains a single hydraulic pump and two hydraulic motors. The geometry of the pump and motor configuration enables a reduced vehicle turning radius, which increases vehicle maneuverability, thereby reducing the time required to complete a task. Additionally, the wheel pivoting geometry of this design is, in the case of a lawn tractor for example, gentler on the vehicle tires and surfaces traversed when traveling and/or mowing. A steering mechanism to pivot the wheel hub assemblies is included and is integrally supported by certain housing components of the drive apparatus. The drive apparatus also includes a power take off (PTO) mechanism integrated therewith that is powered directly by a prime mover that is mounted on the drive apparatus. This application is related to U.S. Ser. No. 14/535,664 filed on Nov. 7, 2014 and entitled "Three Wheeled Vehicle." The terms of that application are incorporated herein by reference in their entirety.

A better understanding of the objects, advantages, features, properties, and relationships of the invention will be obtained from the following detailed description and accompanying drawings, which set forth one or more illustrative embodiments that are indicative of the various ways in which the principles of the invention may be employed.

DETAILED DESCRIPTION OF THE DRAWINGS

Figure 1:
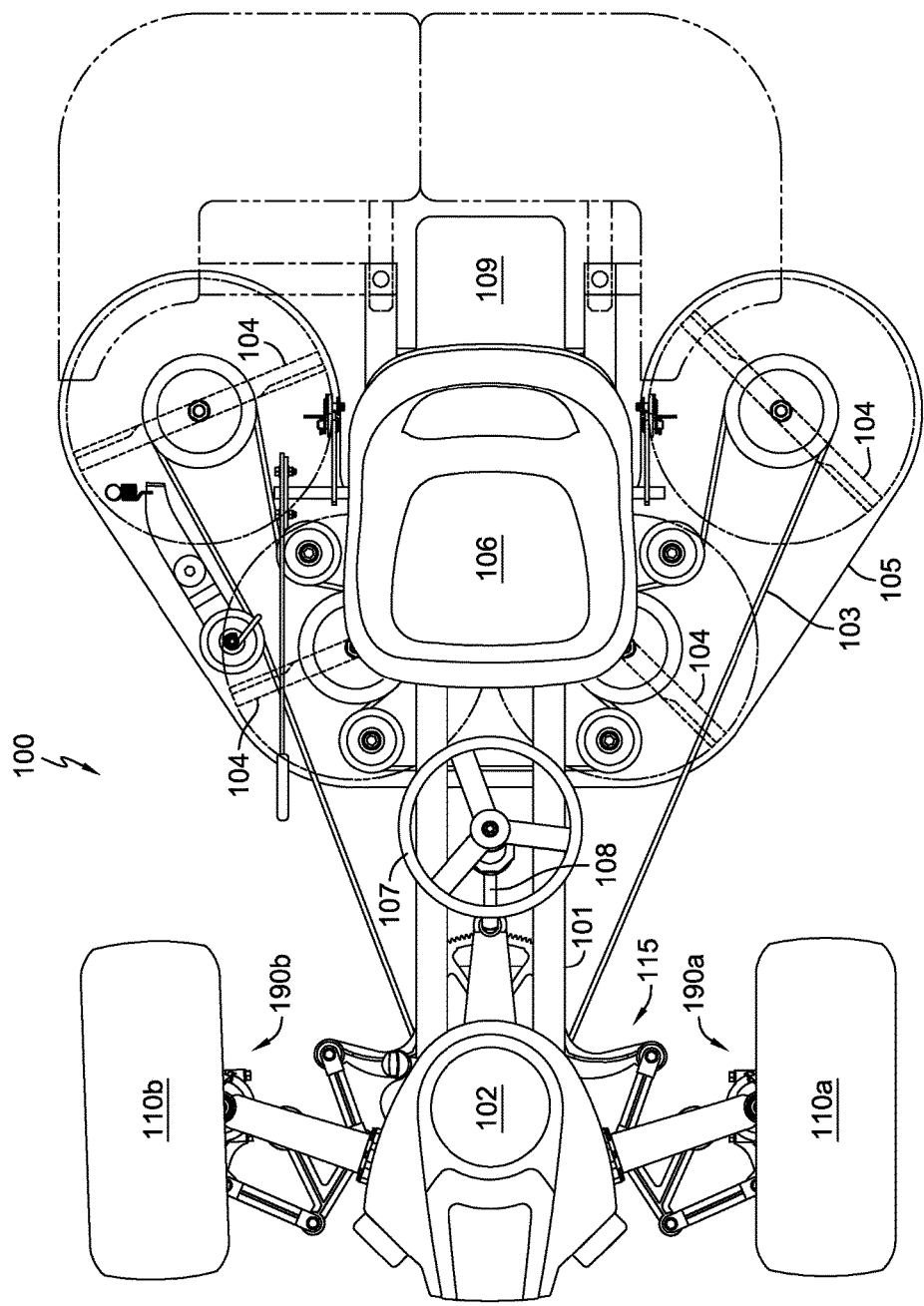
FIG. 1 is a representational top plan view of a front wheel drive, three-wheeled mowing vehicle having a steerable transaxle in accordance with the principles disclosed herein.

The description that follows describes, illustrates, and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

FIG. 1 shows a mowing vehicle 100 having two steered front wheels 110a and 110b and a single non-steered rear wheel 109. Rear wheel 109 is rotatably mounted on a rear axle. Vehicle 100 also has a vehicle frame 101 that supports various components of vehicle 100 (including seat 106), as described in further detail below.

A prime mover 102 is mounted to vehicle frame 101 and transaxle 115. Prime mover 102 provides power to transaxle 115 to propel vehicle 100 by means of powering steered wheels 110a, 110b. Transaxle 115 is described in detail below.

Prime mover 102 also drives a belt and pulley system 103 that is coupled to and drives cutting blades 104. As shown in FIG. 1, cutting blades 104 are housed within a deck 105. Deck 105 has a top and a sidewall that cover and protect cutting blades 104. When viewed from above, deck 105 has a U-shape. A first portion of deck 105, which forms the base of the U-shape, is positioned in front of rear wheel 109. A second portion and a third portion of deck 105 extend rearward and adjacent to the sides of rear wheel 109. A first cutting blade 104 is positioned within deck 105 adjacent one side of rear wheel 109 and a second cutting blade 104 is positioned within deck 105 adjacent the opposite side of rear wheel 109. A third and a fourth cutting blade 104 are positioned within deck 105 and forward of rear wheel 109. As shown in FIG. 1, cutting blades 104 are generally the same size as one another. It will be understood that deck 105 may be articulated and/or include supporting wheels or rollers to prevent scalping, as is known in the art. It is contemplated that the position, as illustrated, of certain portions of deck 105 in relation to rear wheel 109 may contribute to the overall stability of vehicle 100, i.e., with the outboard deck portions functioning as vehicle tip-limiters or outriggers.

Figure 2:
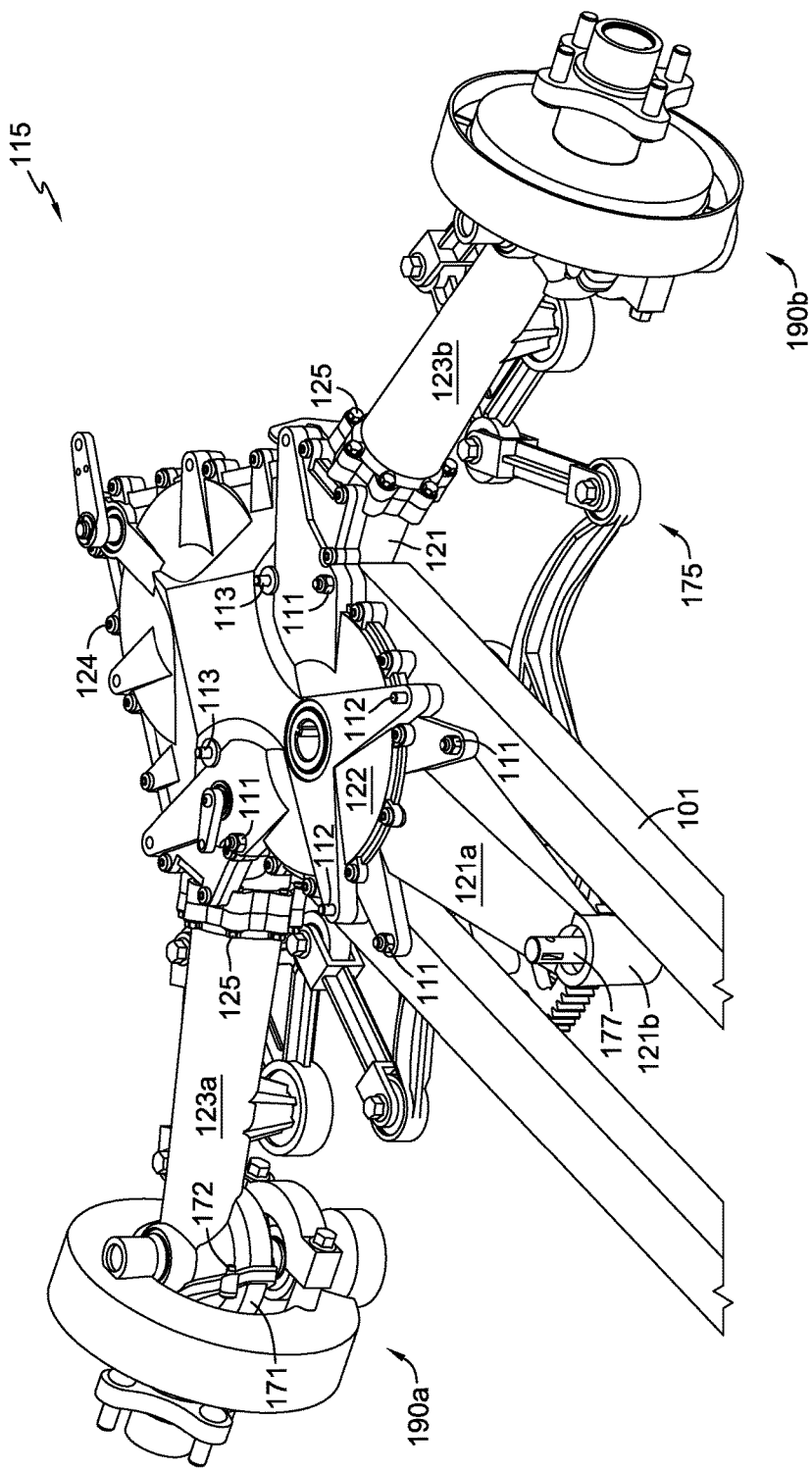
FIG. 2 is a top perspective view of a portion of the vehicle of FIG. 1 including the transaxle and a portion of the vehicle frame.

A steering input device 107, shown in FIG. 1 as a steering wheel, receives user input and translates that input via a steering shaft 108 to steering mechanism 175 (shown in FIG. 2). Steering mechanism 175 includes a plurality of linkages that connect to and steer steered wheels 110a and 110b, which are attached to steering mechanism 175 via wheel hub assemblies 190a and 190b as described in detail below. A main housing member 121 of transaxle 115, referred to herein as main housing 121, provides support and attachment features for steering mechanism 175 as described below.

Figure 3:
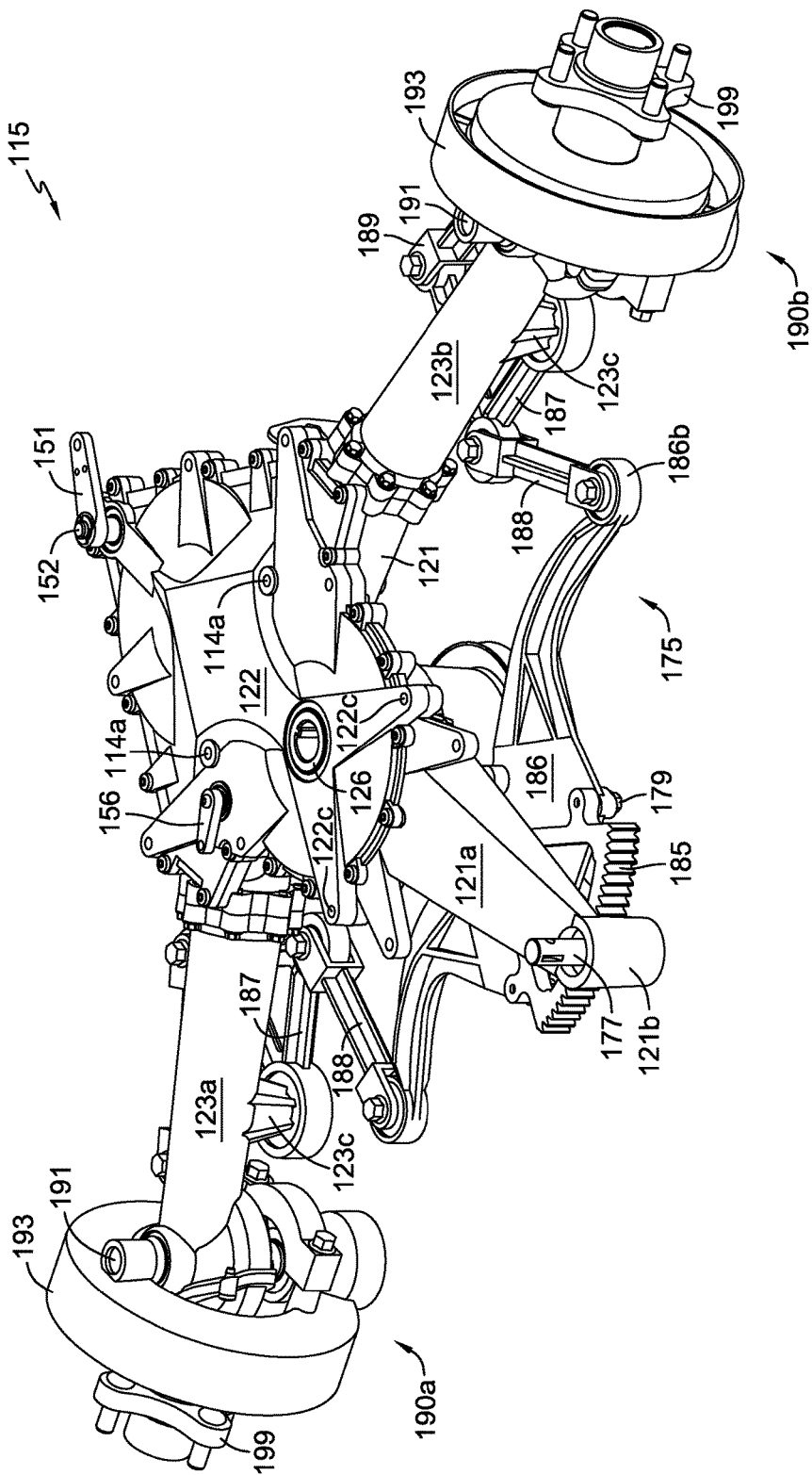
FIG. 3 is a top perspective view of the steerable transaxle of FIG. 2.
Figure 4:
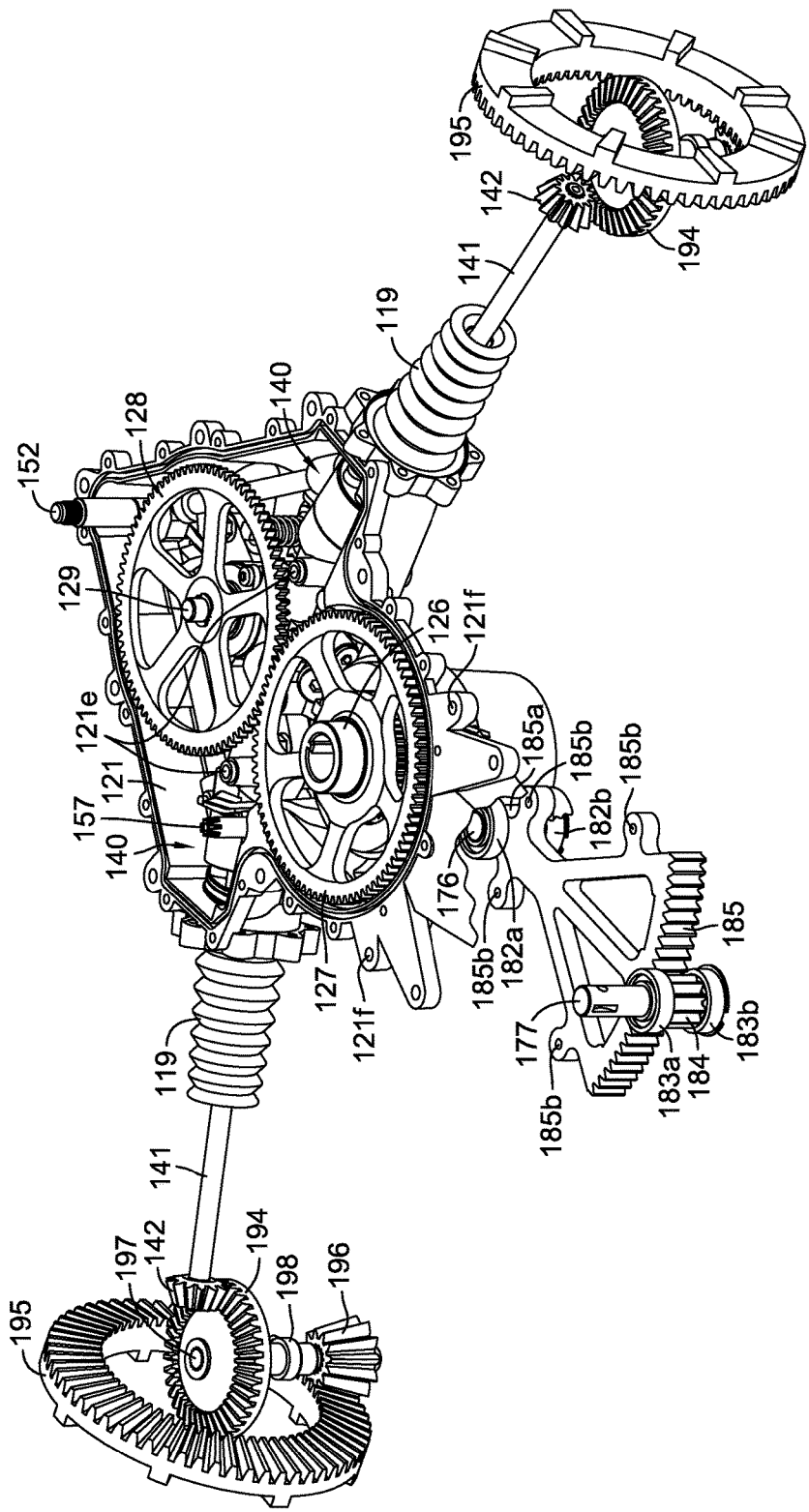
FIG. 4 is a perspective view of the transaxle shown in FIG. 3 with certain housing and other components removed and with a portion of the main housing cut away for clarity.
Figure 5:
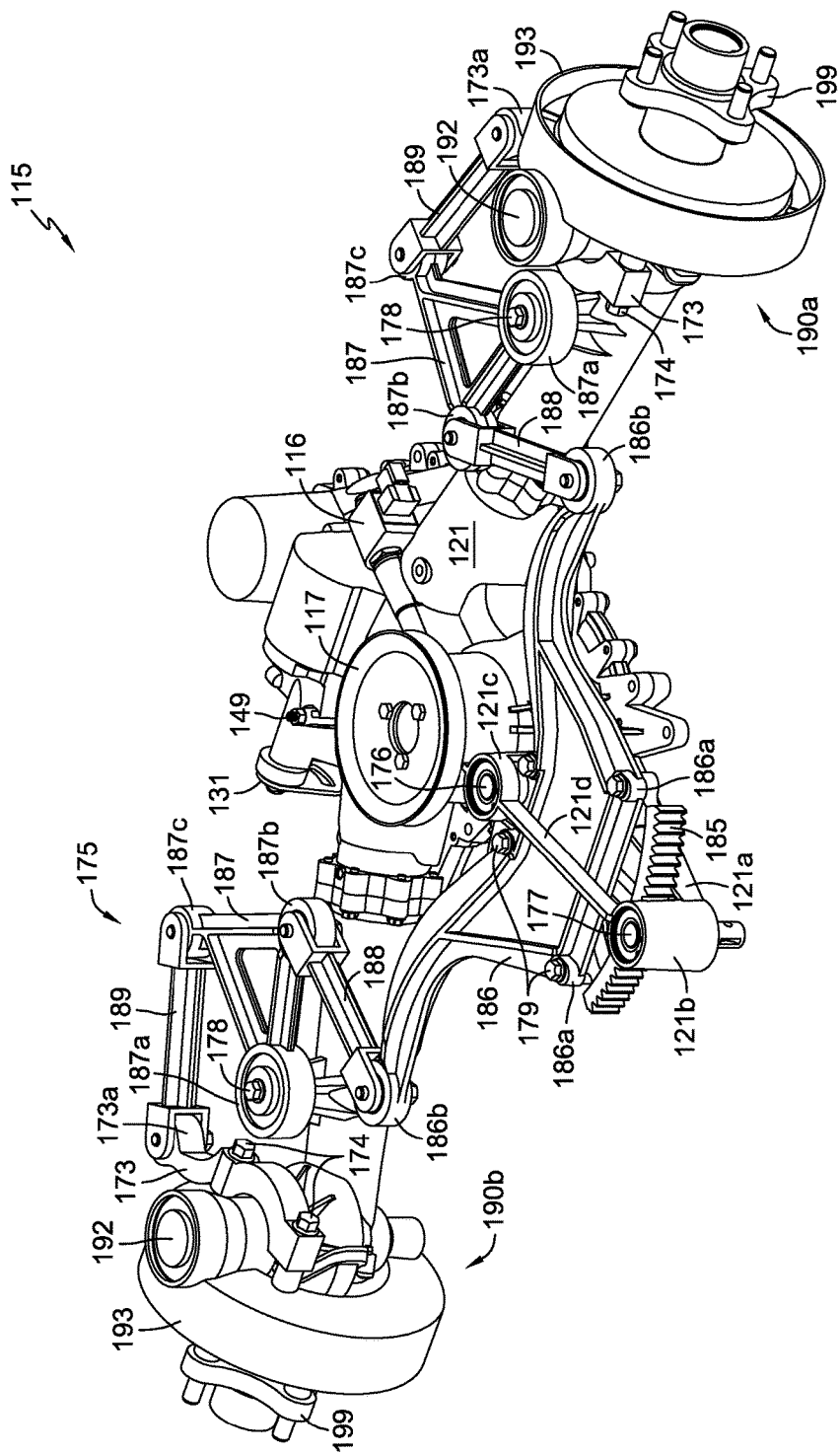
FIG. 5 is a bottom perspective view of the transaxle of FIG. 3.
Figure 6:
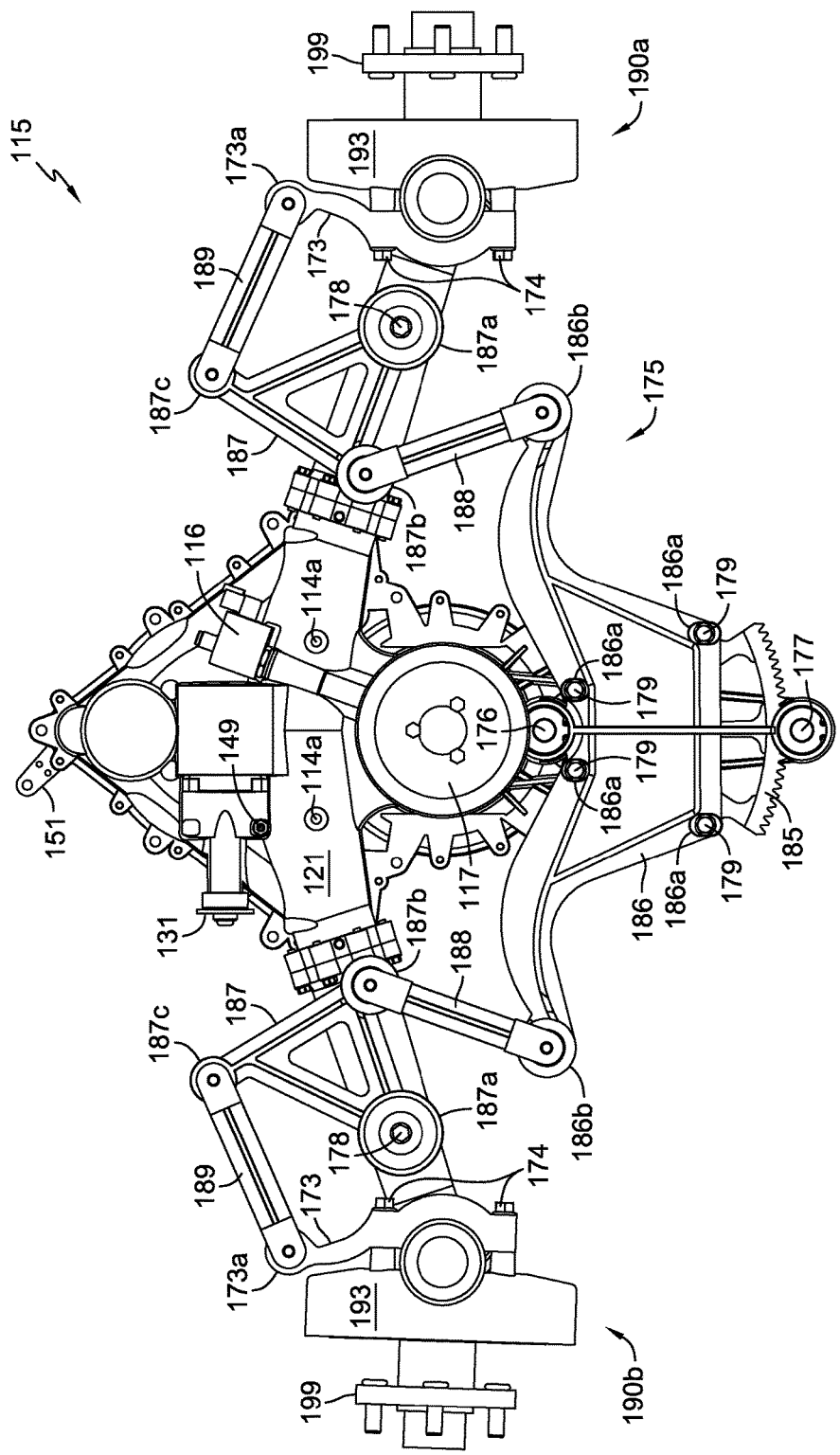
FIG. 6 is a bottom plan view of the transaxle of FIG. 3.
Figure 7:
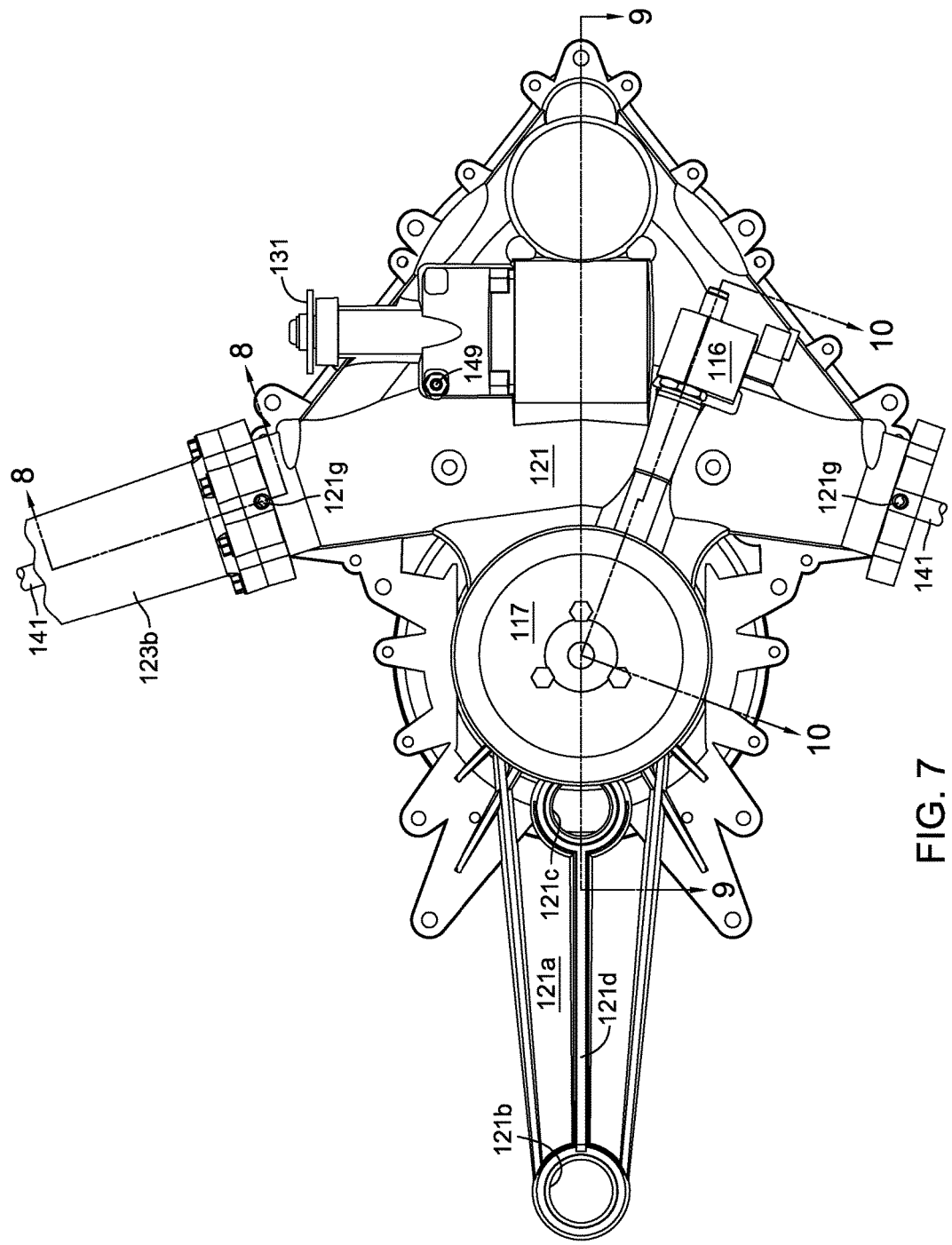
FIG. 7 is a bottom plan view of a portion of the transaxle of FIG. 3.

Details of steering mechanism 175 are shown in FIGS. 2 to 7. Steering shaft 108, shown in FIG. 1, is connected to a pinion shaft 177, which is rotatably disposed in steering pinion support 121b such that rotation of steering shaft 108 rotates pinion shaft 177. Steering pinion support 121b is formed in a steering support structure 121a, which is a portion of main transaxle housing 121 that extends generally rearward relative to the illustrated orientation of vehicle 100. As shown in FIG. 5, steering pinion support 121b is further supported by a brace 121d, which extends rearward in generally the same direction as steering support structure 121a. A first end of brace 121d connects to steering pinion support 121b and a second end of brace 121d connects to pivot pin support 121c. A slat-shaped opening is defined between brace 121d and steering support structure 121a. As shown, brace 121d can be integrally formed as part of main housing 121.

As shown in FIG. 4, a pinion gear 184 is mounted on pinion shaft 177 to rotate therewith. An upper pinion bearing 183a and a lower pinion bearing 183b are housed in steering pinion support 121b to facilitate rotation of pinion shaft 177 relative to main housing 121.

Steering mechanism 175 also includes a steering rack 186, which has a sector gear 185 mounted thereto via a plurality of fasteners 179. Fasteners 179 connect steering rack mounting bosses 185b formed in sector gear 185 to a plurality of corresponding sector gear mounting bosses 186a formed in steering rack 186.

Sector gear 185 is rotatably mounted to main housing 121. A steering rack pivot pin 176 passes through a sector gear pivot collar 185a formed in sector gear 185 and through steering pivot pin support 121c (shown in FIG. 5) formed in main housing 121, thereby rotatably connecting sector gear 185 and steering rack 186 to main housing 121. Steering pivot pin support 121c includes an upper portion and a lower portion with an opening therebetween through which sector gear 185 extends. An upper pivot pin bearing 182a and a lower pivot pin bearing 182b are housed in steering pivot support 121c to facilitate rotation of sector gear 185 relative to main housing 121.

Sector gear 185 meshes with pinion gear 184 such that rotation of pinion gear 184 causes rotation of sector gear 185 and thus rotation of steering rack 186 about the axis of steering rack pivot pin 176. Thus, rotation of steering shaft 108 causes rotation of steering rack 186 about the axis of steering rack pivot pin 176. As shown in FIG. 5, sector gear 185 and steering rack 186 extend through and rotate within the opening defined by steering support structure 121a and brace 121d.

Steering mechanism 175 further includes a pair of pivot arms 187 that are rotatably connected to: (i) steering rack 186 via connectors, shown as tie rods 188 at mounting bosses 186b and 187b; (ii) motor shaft housings 123a and 123b at pivot arm collars 187a; and (iii) steered hub assemblies 190a and 190b via links 189 at mounting bosses 187c and 173a. Tie rods 188 and links 189 can be secured using screws installed through needle bearings at each end of each rod 188 and each link 189, as illustrated in, e.g., FIGS. 3 and 5. Alternatively, pins or other suitable fasteners, as well as other bearing types and bushings, or other combinations known in the art, can be used for these connections.

Pivot arms 187 are rotatably mounted to and supported by motor shaft housings 123a and 123b at pivot arm collars 187a via pivot arm kingpin bolts 178. Pivot arm kingpin bolts 178 pass through bearings in pivot arm collars 187a and into pivot arm mounting supports 123c, which are connected to and extend from motor shaft housings 123a and 123b. Thus, rotation of steering rack 186 causes pivot arms 187 to rotate about pivot arm kingpin bolts 178.

Aforementioned mounting bosses 173a are formed on steering arms 173 that are connected to spindles 193 of hub assemblies 190a and 190b via fasteners 174. Spindles 193 are in turn connected to hubs 199 to which steered wheels 110a and 110b are attached. As described 15 in additional detail below, each spindle 193 is rotatably mounted to shaft 197 via a pair of bearings. Therefore, rotation of pivot arms 187 causes link 189 to act on and pivot hub assembly 190a or 190b about the rotational axis of shaft 197.

Thus, rotation of steering wheel 107 causes rotation of steering rack 186, which in turn rotates pivot arms 187. Rotation of pivot arms 187 causes rotation of steered hub assemblies 190a and 190b to which wheels 110a and 110b are mounted, thereby steering wheels 110a and 110b.

As shown in FIGS. 2 and 3, transaxle 115 includes a centrally located main housing 121 joined to motor shaft housings 123a, 123b by fasteners 125. Housing cover 122 is joined to main housing 121 by fasteners 124 and end caps 171 are joined to motor shaft housings 123a, 123b by fasteners 172. These joints are sealed to form a sump 120 (shown in FIG. 8) that provides hydraulic fluid throughout the interior of transaxle 115 for the operation of the hydrostatic transmission components, such as pump assembly 130 (shown in FIG. 9) and motor assemblies 140 (shown in FIG. 4) disposed on center section 135 (shown in FIGS. 9 and 11), and for hydraulic PTO mechanism 160 (shown in FIGS. 9 and 10). Additionally, sump 120 provides lubrication for various bearings, gears, and other moving parts, including certain gears located in steerable hub assemblies 190a and 190b.

Figure 8:
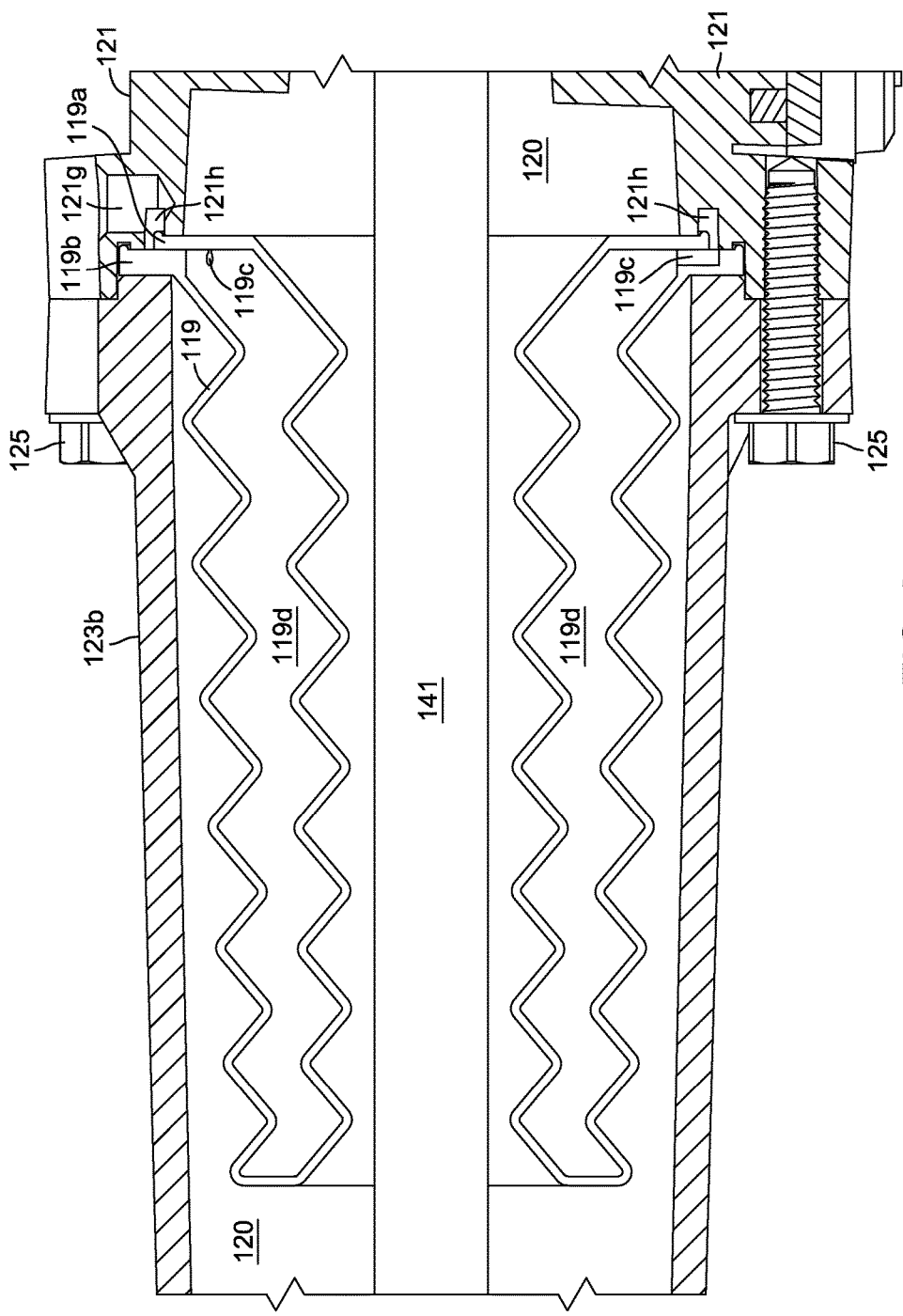
FIG. 8 is a cross-sectional view along line 8-8 of FIG. 7.

As illustrated in FIGS. 4 and 8, an expandable member shown as a bellows 119 is provided in each motor shaft housing 123a, 123b to accommodate fluid expansion inside sealed transaxle 115. Bellows 119 is disposed about each motor shaft 141 such that hydraulic fluid of sump 120 can flow around bellows 119 to fill motor shaft housings 123a, 123b. Allowing hydraulic fluid into motor shaft housings 123a, 123b reduces the operating temperature of transaxle 115 and provides fluid to lubricate pinion gears 142 and upper bevel gears 194. Each bellows 119 includes a first flange 119a that butts against main housing 121 and a second flange 119b that butts against both first flange 119a and main housing 121. When motor shaft housings 123a, 123b are attached to main housing 121, flanges 119a and 119b are captured and pressed together to form air chamber 119d. A plurality of vent grooves 119c are formed in second flange 119b to vent air from chamber 119d into annular groove 121h formed in main housing 121 and out through breather port 121g (which is in pneumatic communication with annular groove 121h) formed in main housing 121 when the fluid temperature of transaxle 115 rises. As the fluid temperature of transaxle 115 falls, air is drawn back into chamber 119d via annular groove 121h and vent grooves 119c. Breather port 121g is also used to apply suction to chamber 119d via annular groove 121h and vent grooves 119c to collapse bellows 119 at assembly to ensure that bellows 119 is not distorted as sump 120 is filled with hydraulic fluid. After the appropriate amount of hydraulic fluid is added to sump 120, suction is removed from breather port 121g so that bellows 119 is allowed to expand to its proper undistorted shape. While it is preferred to have a bellows 119 located in each motor shaft housing 123a, 123b, it should be understood that a transaxle similar to transaxle 115 but equipped with a single bellows 119 in only one of the motor shaft housings 123a or 123b is also contemplated within the scope of the invention, e.g., where service with lesser operating temperatures and fluid expansion is required.

Figure 9:
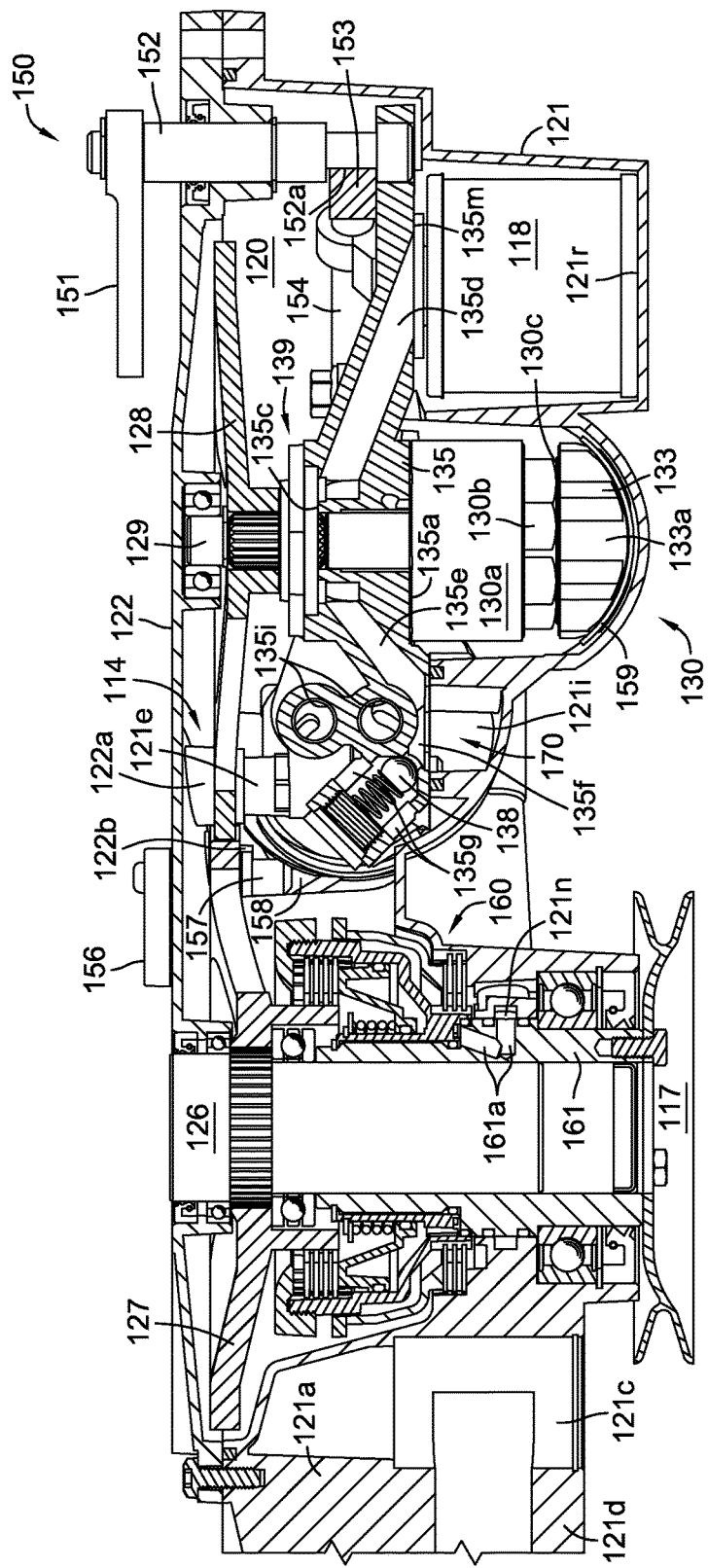
FIG. 9 is a cross-sectional view along line 9-9 of FIG. 7.
Figure 10:
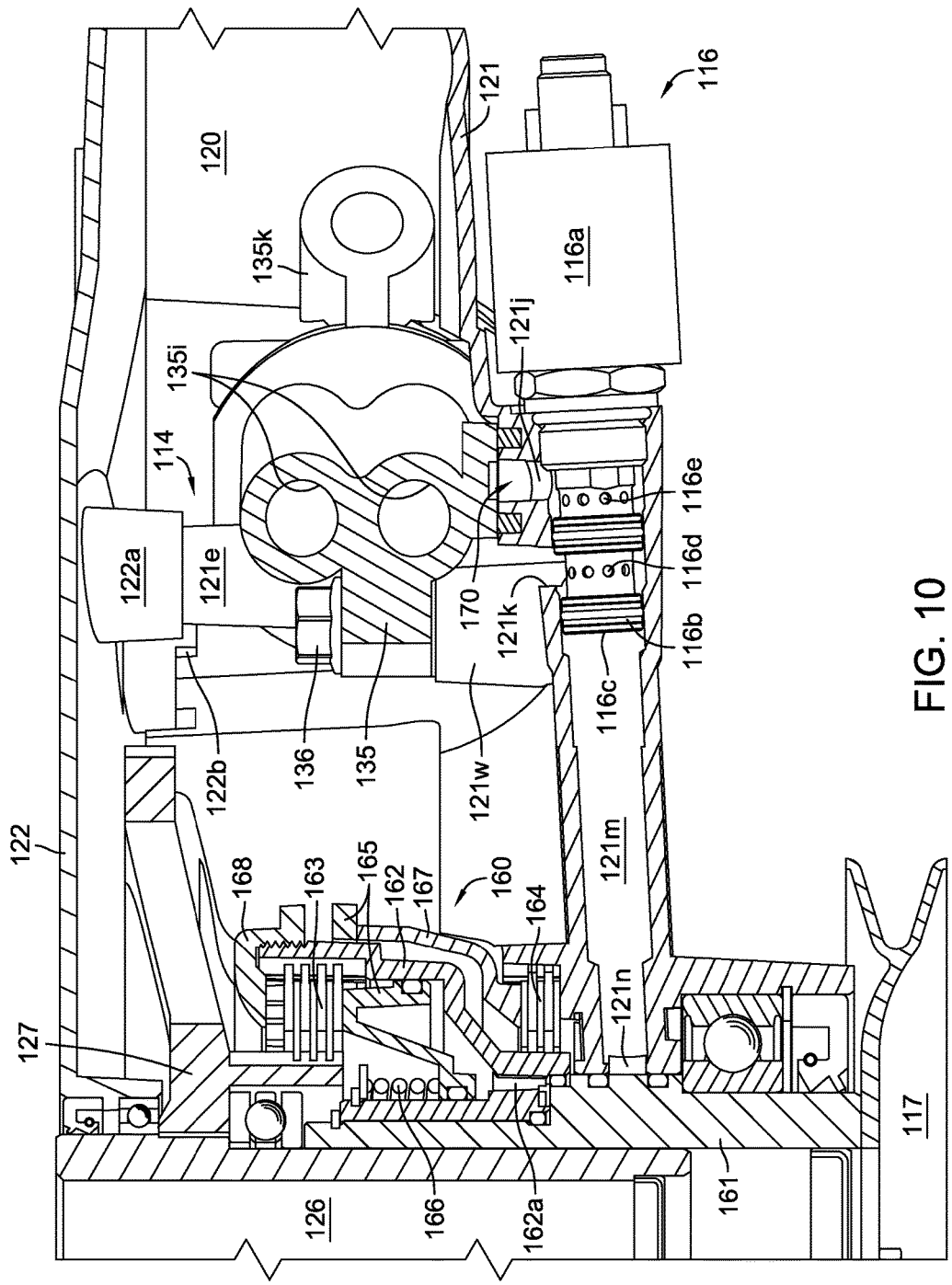
FIG. 10 is a cross-sectional view along line 10-10 of FIG. 7.
Figure 15:
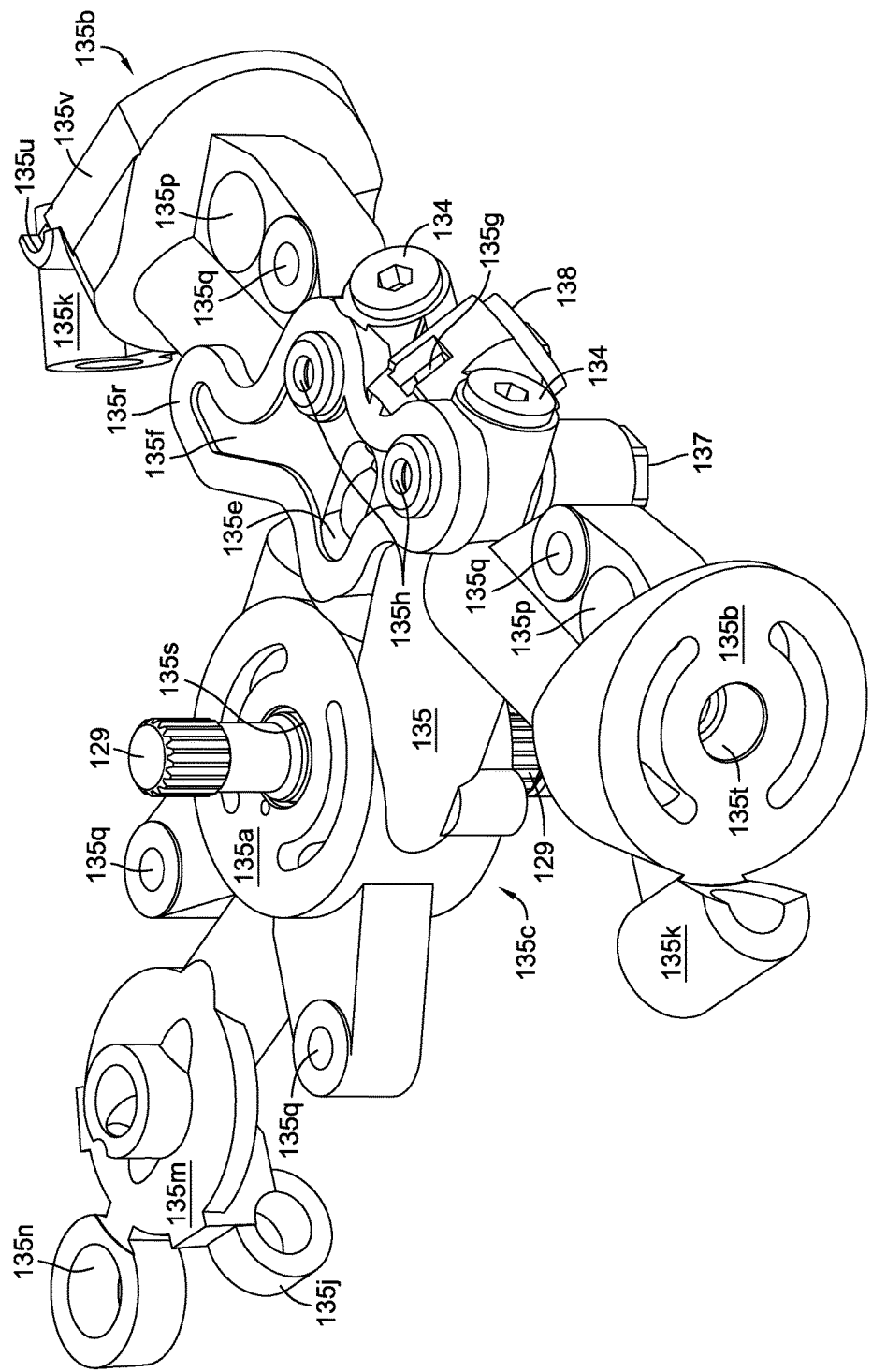
FIG. 15 is a top perspective view of the center section of the hydrostatic transmission of the transaxle of FIG. 3 including certain additional components.

Prime mover 102 is mounted on transaxle 115 and drives input tube 126. As shown in FIGS. 4 and 9, input tube 126 is drivingly engaged to a clutch gear 127 that carries a portion of clutch plates 163, as shown in FIG. 10, and also drives a pump gear 128. Pump gear 128 is drivingly engaged to a pump input shaft 129. As shown in FIG. 9, pump input shaft 129 is supported at its upper end by a bearing located in housing cover 122 and extends through a journal opening 135s formed in center section 135, as shown in FIG. 15. Journal opening 135s may have a journal bearing installed therein to improve wear characteristics. Pump input shaft 129 drives a gerotor charge pump 139 located proximate to its upper end and a pump assembly 130 positioned at its lower end. Pump gear 128 is supported on thrust washer 139a recessed in charge pump cover 139b that is shown, e.g., in FIG. 13. Gerotor charge pump 139 is disposed on charge pump running surface 135c on an upper side of center section 135 and pump assembly 130 is disposed on pump running surface 135a on an opposite, lower side of center section 135.

Referring to FIGS. 7, 9, 12, and 14, pump assembly 130 is a known axial piston pump configuration comprising a rotating cylinder block 130a carrying a set of spring-biased pistons 130b that bear against a thrust bearing 130c that is seated in a recess formed in swash plate 133. Swash plate 133 slides on cradle bearings 159 seated in swash plate pocket 121s formed in main housing 121. A control arm 131 is fixed to an end of shaft 132a of a trunnion arm 132 that extends from main housing 121. Protrusion 132c formed on arm portion 132b of trunnion arm 132 engages slot 133a formed in swash plate 133 to control the output of axial piston pump 130 in a known manner by moving swash plate 133 and associated thrust bearing 130c arcuately in a first or second direction from an initial hydraulic neutral position in order to ultimately cause wheel hubs 199 to rotate in a first or second direction. Arm 132b includes a pair of stops 132d formed thereon that come into contact with corresponding stops 121y formed in housing 121 to limit this arcuate movement. In the illustrated embodiment, trunnion arm 132 and swash plate 133 share a collinear axis of rotation.

Figure 12:
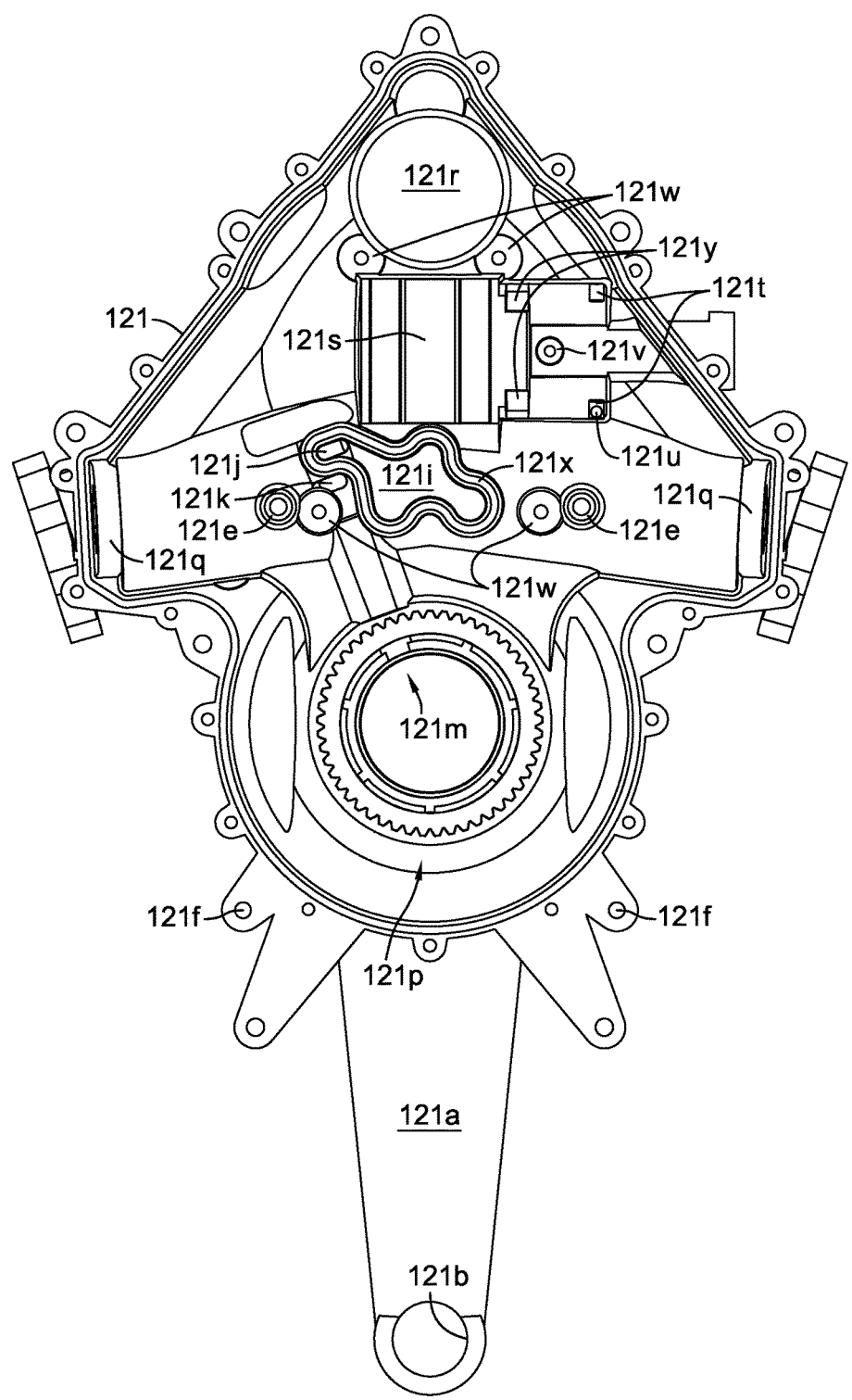
FIG. 12 is a top plan view of the main housing of the transaxle of FIG. 3.
Figure 13:
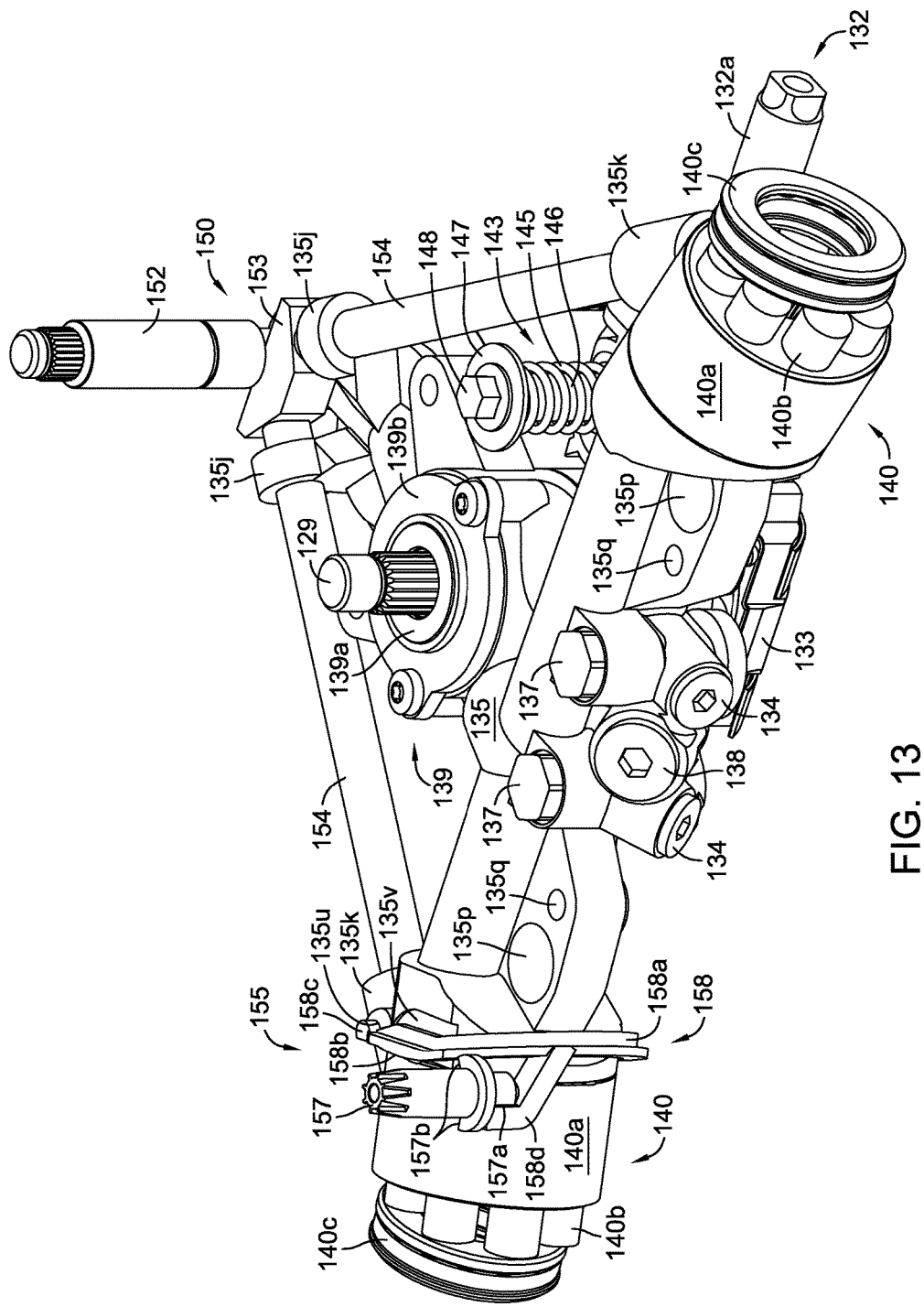
FIG. 13 is a top perspective view of the hydrostatic transmission of the transaxle of FIG. 3 including brake, bypass, and RTN mechanisms.
Figure 14:
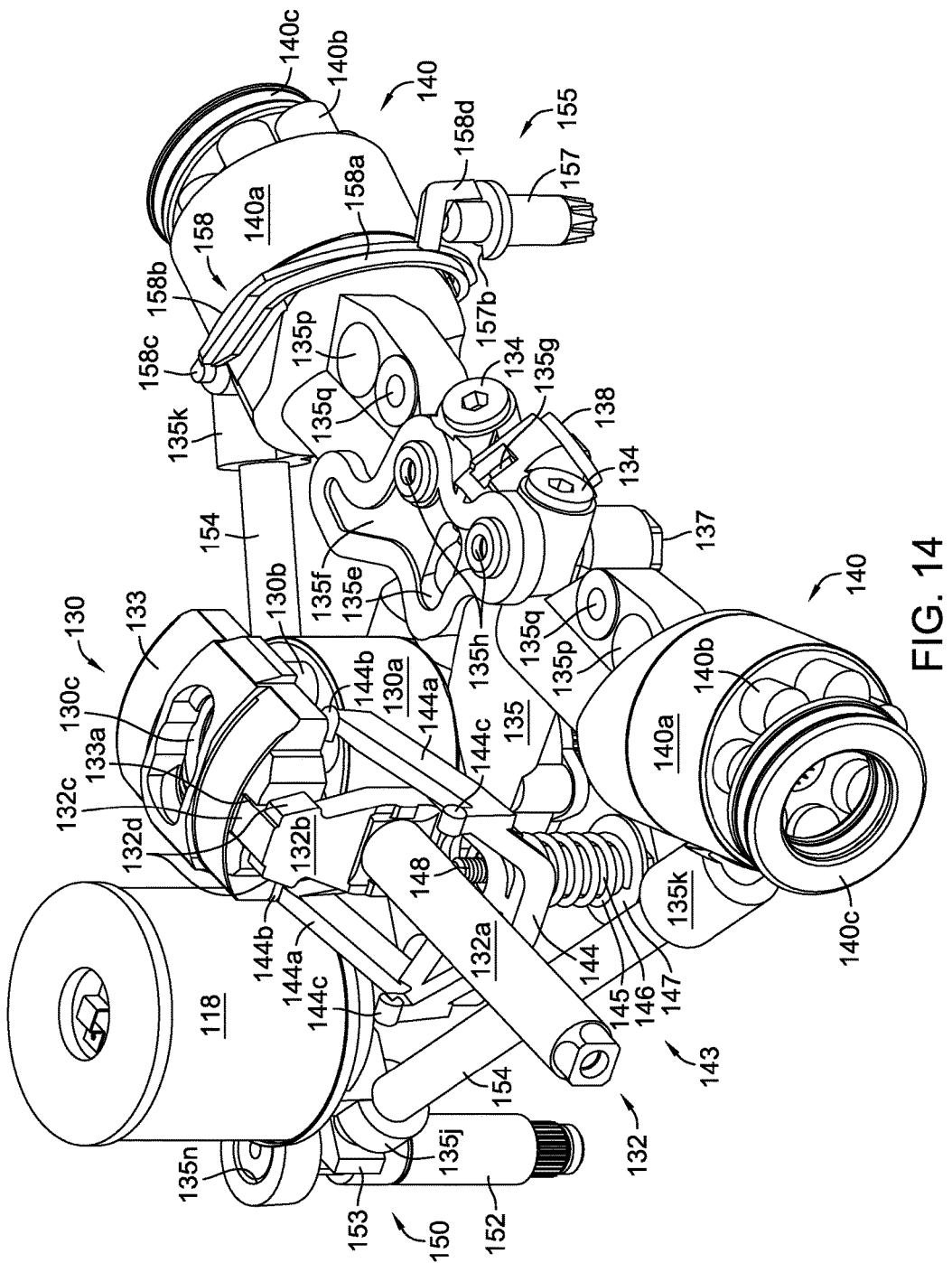
FIG. 14 is a bottom perspective view of the hydrostatic transmission of the transaxle of FIG. 3 including brake, bypass, and RTN mechanisms.

A return-to-neutral (RTN) mechanism 143, shown in, e.g., FIGS. 1, 13, and 14, is provided to force swash plate 133 to return pump 130 to its initial hydraulic neutral position when an applied rotational force is removed from control arm 131. RTN mechanism 143 includes a return plate 144 having a pair of pivots 144c formed thereon that are seated in pivot recesses 121t formed in main housing 121 shown in FIG. 12. Return plate 144 also has a pair of tines 144a that extend toward swash plate 133. A pair of contactors 144b formed at the ends of tines 144a contact swash plate 133. A spring 145 is positioned about a spacer 146. One end of spring 145 bears against washer 147 and the other end bears against pocket 144d formed in return plate 144. Fastener 148 engages boss 121v formed in housing 121 to secure washer 147, spring 145 and spacer 146, with spacer 146 setting the proper compressed height of spring 145 when fastener 148 is installed. A neutral set screw 149 (shown in FIG. 5) is provided in opening 121u formed adjacent one of pivot recesses 121t. Neutral set screw 149 bears against one of pivots 144c to adjust the position of return plate 144 to align swash plate 133 into the initial hydraulic neutral position wherein swash plate 133 is approximately parallel to pump running surface 135a.

Referring to FIGS. 11, 12, 13, and 14, motor assemblies 140 are generally of the same axial piston configuration as pump assembly 130. Each motor assembly 140 comprises a motor cylinder block 140a carrying a set of spring-biased pistons 140b that bear against a thrust bearing 140c. Each motor cylinder block 140a is disposed on a running surface 135b formed on center section 135, and each motor running surface 135b forms a plane, wherein the two planes are not parallel, but both such planes are perpendicular to a plane formed by pump running surface 135a. This center section configuration affects the overall geometry of transaxle 115 and enhances the ability of a vehicle so equipped, such as vehicle 100 of FIG. 1, to execute tight turns by providing additional clearance for the inside steered wheel during a turn, e.g. steered wheel 110a during a left-hand turn. It should be understood, however, that a transaxle similar to transaxle 115 but having substantially parallel motor running surfaces (not shown) is also contemplated within the scope of the invention.

Each thrust bearing 140c is seated in a pocket 121q of main housing 121 at a fixed angle relative to its associated running surface 135b, such that motor assemblies 140 provide fixed displacement output. As is known in the art, a valve plate (not shown) may be disposed on each of pump and motor running surfaces 135a, 135b to reduce wear and extend the service life of transaxle 115.

As shown in FIGS. 9 and 10, motor assemblies 140 are hydraulically driven by pump 130 via porting 135i formed in center section 135. Porting 135i hydraulically connects pump running surface 135a to each of the two motor running surfaces 135b and also connects the two motor running surfaces 135b to one another to form a closed-loop hydraulic circuit. Porting 135i also includes passages and ports formed in center section 135 to communicate with valves that regulate fluid flow and pressure in the hydraulic circuit.

As shown in FIG. 9, hydraulic fluid from sump 120 passes through a filter 118 disposed on filter seal land 135m formed on center section 135 and seated in filter pocket 121r formed in main housing 121. Filter pocket 121r is adjacent swash plate pocket 121s. The bottom surface of filter pocket 121r bears against filter 118 to maintain a seal against seal land 135m. Filtered fluid from filter 118 passes through a charge inlet passage 135d formed in center section 135 to gerotor charge pump 139. Charge pump 139 then pumps fluid through charge outlet passage 135e formed in center section 135 into a charge gallery 170 that serves to supply pressurized make-up fluid needed due to fluid losses from porting 135i during operation of transaxle 115.

Charge gallery 170 is formed by the alignment and sealing of charge gallery pockets 121i and 135f along seal groove 121x and mating seal land 135r, when center section 135 is attached to main housing 121. Shock valve inlet openings 135h are disposed in charge gallery 170 so that a pair of shock valves 137, disposed on shock valve openings 135h, is in hydraulic communication with charge gallery 170. Each of shock valves 137 is also in communication with one side of the hydraulic circuit, i.e., either the low pressure side or high pressure side. Shock valves 137 allow make-up hydraulic fluid to be drawn through shock valve 137 that is in communication with the low pressure or suction side of the hydraulic circuit, thereby compensating for fluid losses during operation of transaxle 115.

Shock valves 137 can be of the configuration claimed in commonly-owned U.S. Pat. No. 7,066,199, which is incorporated herein in its entirety. Alternatively, simple poppet valves may be used in lieu of shock valves 137. Also in communication with charge gallery 170 is charge relief valve 138 which, during normal operation, remains open to bleed excess charge fluid to sump 120 through openings 135g formed in center section 135. Charge relief valve 138 closes when fluid pressure in charge gallery 170 drops below a predetermined minimum due to increased demand from the hydraulic circuit. Plugs 134 shown adjacent charge relief valve 138 are used to seal machined passages of porting 135i that communicate with shock valves 137.

PTO mechanism 160 is illustrated in, e.g., FIGS. 9, 10, 11, and 12. PTO mechanism 160 is substantially supported in a centrally located, open pocket 121p formed in main housing 121.

Referring to FIGS. 9, 10, and 12, charge gallery 170 is also in hydraulic communication with PTO valve assembly 116 which, in the illustrated embodiment, is a solenoid-actuated valve assembly. In this embodiment, PTO valve assembly 116 has a solenoid 116a to operate a 2-position, 3-way spool valve 116b. In an alternative embodiment (not shown), valve 116b can be operated manually via operator-controlled linkage (not shown).

PTO valve assembly 116 controls flow of hydraulic fluid from charge gallery 170 to either PTO drive tube 161 to engage PTO mechanism 160 or to sump 120 to disengage PTO mechanism 160. When solenoid 116a is energized, flow is allowed from a first port 116e to a second port 116c, while a third port 116d is blocked. Therefore, when solenoid 116a is energized, pressurized fluid flows from charge gallery 170 through an opening 121j formed in charge gallery pocket 121i, through valve 116b, and through passage 121m to cause engagement of PTO mechanism 160.

When solenoid 116a is de-energized, flow is allowed from second port 116c to third port 116d, while first port 116e is blocked. Therefore, when solenoid 116a is de-energized, fluid flows from PTO mechanism 160 through passage 121m, through valve 116b, through opening 121k formed adjacent charge gallery pocket 121i, and into sump 120, thereby causing PTO mechanism 160 to disengage.

To engage the clutch mechanism of PTO mechanism 160, pressurized fluid flows through passage 121m and into annulus 121n formed in main housing 121. Annulus 121n communicates with a fluid passage 161a formed in a drive tube 161 that is rotationally supported in main housing 121. A lower portion of input tube 126 is rotationally supported by drive tube 161. Pressurized fluid flows through passage 161a and then through openings 162a formed in clutch basket 162 to act against and move piston 165 in a first direction. Movement of piston 165 in this first direction forces clutch plates 163, portions of which are carried by clutch gear 127 and basket 162, against one another and against clutch collar 168. This force induces frictional clutch engagement that causes clutch basket 162 and drive tube 161 to rotate together with clutch gear 127 and input tube 126. Clutch basket 162 is drivingly engaged to drive tube 161 by mating splines or the like.

Piston 165 is biased by a spring 166 in a second direction, opposite the first direction, to push a clutch ring 167 against brake plates 164, a portion of which is carried by clutch basket 162 and a non-rotating portion of which is engaged to main housing 121, so that basket 162 is braked when pressurized fluid is removed from piston 165 and dumped to sump 120 through valve 116b to return PTO mechanism 160 to its disengaged, braked state.

A pulley 117 can be attached to drive tube 161 of PTO mechanism 160 to enable selective driving of vehicle equipment, such as blades 104 of mowing deck 105 of vehicle 100 shown in FIG. 1, via belt and pulley system 103.

Referring to, e.g., FIGS. 9, 10, 11, 13, 14, and 15, a bypass mechanism 155, shown as a block-lift bypass, is provided to allow an operator to effectively disconnect the hydraulic fluid circuit that exists between axial piston pump 130 and axial piston motors 140 to avoid resistance encountered when hydraulically driving unpowered transaxle 115. Actuation of bypass mechanism 155 allows hubs 199 to freely rotate so an operator of a vehicle can more easily move the vehicle without powering it. Bypass mechanism 155 includes a bypass arm 156 attached to a bypass actuation shaft 157 that is rotationally supported in and extends from housing cover 122. Bypass actuation shaft 157 is oriented generally parallel to pump input shaft 129 and includes a cam surface 157a formed at its distal end. A generally U-shaped block-lift member 158 is pivotably disposed on and straddles a portion of center section 135 proximate to one of the two motor running surfaces 135b. Block-lift member 158 comprises a bail 158a having two pivots 158c formed at opposite ends thereof to engage corresponding pivot recesses 135u formed adjacent flat surfaces 135v formed on center section 135. Flat surfaces 135v help position block-lift member 158 while providing clearance for the pivoting motion of bail 158a. Bail 158a includes two lift surfaces 158b formed thereon to bear against opposite sides of cylinder block 140a to provide balanced lifting of cylinder block 140a to prevent damage to motor running surface 135b when bypass mechanism 155 is actuated. To facilitate actuation, an actuation bar 158d extends from bail 158a to engage with cam surface 157a. When bypass arm 156 and actuation shaft 157 are pivoted either clockwise or counterclockwise, cam surface 157a bears against actuation bar 158d to force bail 158a to pivot, thereby lifting cylinder block 140a from running surface 135b. Actuation shaft 157 includes a pair of rotational stops 157b formed thereon that interface with a mating stop member, shown as post 122b formed on the interior side of housing cover 122, to limit rotation of shaft 157 in order to limit the distance that motor cylinder block 140a is lifted from motor running surface 135b.

As shown in, e.g., FIGS. 9, 11, 13, and 14, a brake mechanism 150 is also provided. Brake mechanism 150 is ideally used as a static parking brake, but may have some dynamic braking capability dependent upon materials used, coefficients of friction, size of components, weight of a vehicle in which transaxle 115 is installed, etc. Brake mechanism 150 includes a brake arm 151 attached to a brake shaft 152 that extends from housing cover 122. Brake shaft 152 is pivotably supported proximate to its upper end in housing cover 122 and at its lower end in opening 135n formed in center section 135. It will be understood that brake shaft 152 could also be pivotably supported at its lower end elsewhere in the main housing 121, such as by a pocket (not shown) in the main housing itself. A pair of brake rods 154 is supported by a first set of brake rod guides 135j proximate to a first end of each brake rod 154 and by a second set of brake rod guides 135k proximate to a second end of each brake rod 154.

Figure 11:
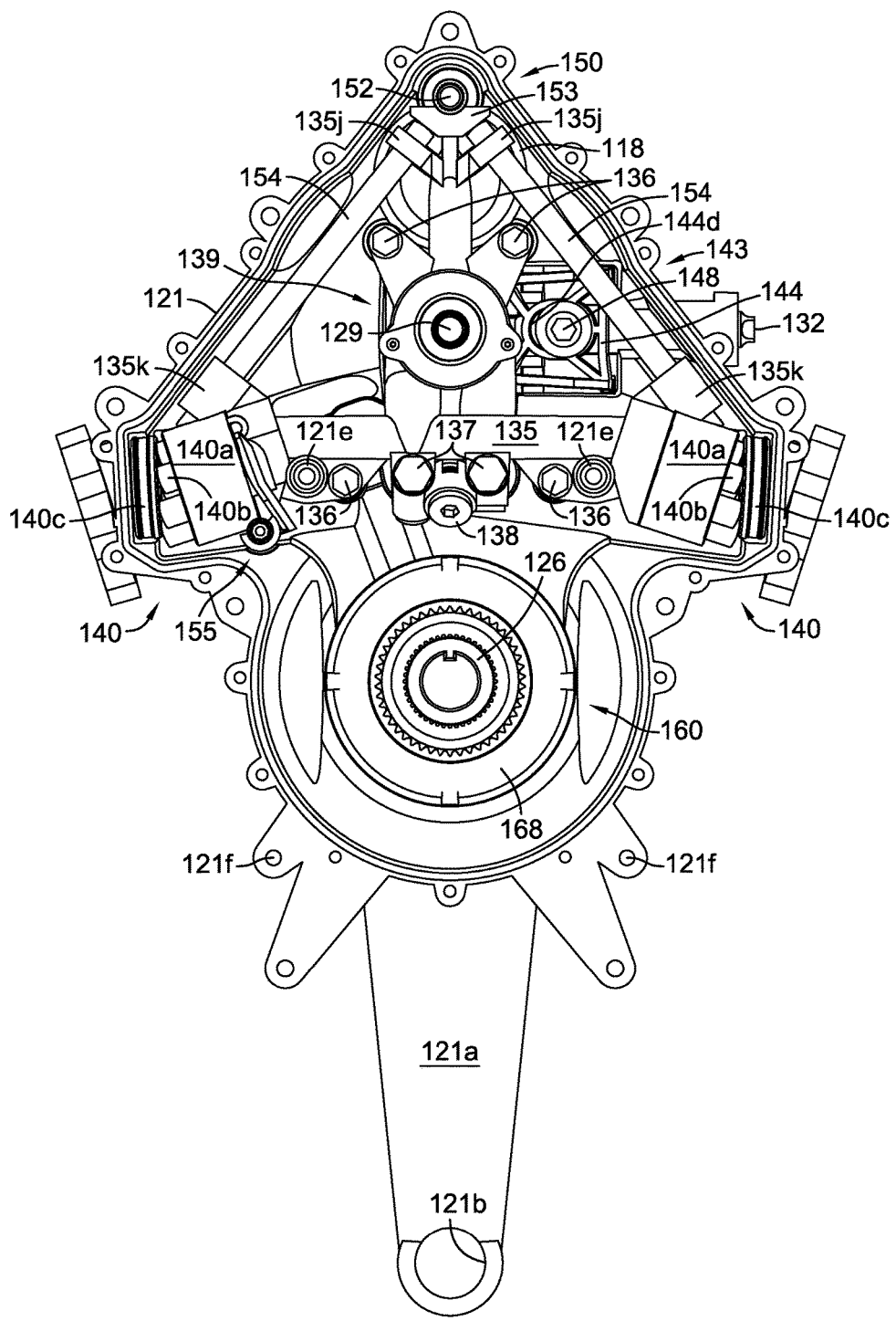
FIG. 11 is a top plan view of a portion of the transaxle of FIG. 3 including the hydrostatic transmission and the PTO mechanism.

Referring to, e.g., FIGS. 11, 13, and 15, first set of brake rod guides 135j is integrally formed with center section 135 adjacent filter land 135m while second set of brake rod guides 135k is integrally formed with center section 135 adjacent motor running surfaces 135b. Brake shaft 152 includes an integrally formed cam 152a (shown in FIG. 9) that exerts force against a force transfer member, shown as a puck 153, when brake shaft 152 is pivoted. In turn, force transfer member 153 simultaneously exerts force against the first end of both brake rods 154 which in turn exert force against both motor cylinder blocks 140a. Brake rods 154 contact motor cylinder blocks 140a at an oblique angle, thereby applying more braking force to cylinder blocks 140a with less applied force to brake arm 151 than would likely be required to achieve similar braking results if brake rods 154 contacted cylinder blocks 140a at right angles. Brake arm 151 can be pivoted either clockwise or counterclockwise to affect braking of motor cylinder blocks 140a.

Each motor cylinder block 140a is drivingly engaged to a motor shaft 141 having a pinion gear 142 affixed thereon to drive the reduction gears of steerable hub assemblies 190a and 190b. Therefore, steerable hub assemblies 190a and 190b, including wheel hubs 199, are braked when motor cylinder blocks 140a are braked.

Each motor shaft 141 is supported near its driven end in a journal opening 135t formed in center section 135. Each journal opening 135t may have a journal bearing installed therein to improve wear characteristics. Each motor shaft 141 also drives a pinion gear 142 and is supported near pinion gear 142 at its driving end by a bearing (not shown) supported in each motor shaft housing 123a, 123b.

Referring to, e.g., FIGS. 3, 4, and 5, each pinion gear 142 drives an upper bevel gear 194 (disposed in sump 120) that is drivingly engaged to a gear shaft 197 by splines or the like. Each gear shaft 197 is rotationally supported near its upper end by a bearing mounted in one of motor shaft housings 123a, 123b and extends downward and out of housing 123a, 123b through a pivot tube 198 that is also supported in motor shaft housing 123a, 123b. At its lower end, each gear shaft 197 is engaged, by splines or the like, to a lower bevel gear 196 that drives a hub gear 195. Each hub 199 is rotationally supported by bearings disposed on a spindle 193 and is drivingly engaged to hub gear 195. Each spindle 193 and, therefore, each hub assembly 190a, 190b, pivots about the rotational axis of shaft 197. Each spindle 193 is supported by bearings positioned above and below bevel gear 196. The bearing positioned below bevel gear 196 is supported in a thrust plug 192 that may be separated from the bearing positioned above bevel gear 196 by a generally conical spacer (not shown). Each spindle 193 is also supported above gear shaft 197 by a pivot pin 191 that is rotationally supported in a bearing installed in the upper portion of spindle 193.

Center section 135, shown in, e.g., FIGS. 9, 10, 11, 13, 14, and 15, is attached to main housing 121 by inserting fasteners 136 through openings 135q to engage bosses 121w. Support members or tubes 121e protrude through openings 135p to align center section 135 during assembly. After internal components are assembled into main housing 121, support tubes 121e are slip-fit and sealed with mating support members or tubes 122a of housing cover 122 to form support structures 114 that provide openings 114a through transaxle 115 for attachment of prime mover 102 with fasteners 113 shown in FIG. 2. Additionally, fasteners 112 are installed through a vehicle frame 101 and through aligned openings 121f, 122c to secure both transaxle 115 and prime mover 102 to vehicle frame 101. Additional fasteners 111 are provided as needed to further secure transaxle 115 to vehicle frame 101.

While one or more specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of any appended claims and any equivalent thereof.

We claim:

1. A drive apparatus for a vehicle having a prime mover, the drive apparatus comprising:
    a housing forming a sump and comprising a main housing member and a housing cover sealed thereto;
    a transmission disposed in the sump and comprising:
        a center section containing porting;
        a hydraulic pump disposed on the center section; and
        a first hydraulic motor engaged to and driving a first motor shaft and a second hydraulic motor engaged to and driving a second motor shaft, wherein both hydraulic motors are disposed on the center section and in hydraulic communication with the hydraulic pump through the porting to form a hydraulic circuit;
    a first motor shaft housing joined to the main housing member and enclosing the first motor shaft, and a second motor shaft housing joined to the main housing member and enclosing the second motor shaft;
    a pinion shaft having a pinion gear and rotatably mounted on the main housing member;
    a steering rack having a sector gear meshed with the pinion gear and rotatably mounted on the main housing member;
    a first steering arm rotatably mounted to the first motor shaft housing and connected to the steering rack via a first connector; and
    a second steering arm rotatably mounted to the second motor shaft housing and connected to the steering rack via a second connector.

2. The drive apparatus of claim 1, wherein the center section has a first motor running surface at a first end of the center section and defining a first plane, a second motor running surface at a second end of the center section and defining a second plane, and a pump running surface on a middle portion of the center section and defining a third plane.

3. The drive apparatus of claim 2, wherein the first plane is not parallel to the second plane, and the first and second planes are both perpendicular to the third plane.

4. The drive apparatus of claim 1, further comprising a charge pump disposed on the center section, wherein the charge pump is in fluid communication with the sump via porting in the center section, a charge relief valve positioned between the charge pump and the sump, and a charge gallery defined by a portion of the main housing member and a portion of the center section, the charge gallery being and in fluid communication with the charge pump.

5. The drive apparatus of claim 4, further comprising a shock valve disposed in an opening in the center section and in hydraulic communication with the charge gallery and one of a low pressure side and a high pressure side of the hydraulic circuit.

6. The drive apparatus of claim 1, further comprising a first support member extending from an interior portion of the main housing member and a second support member extending from the housing cover and sealed to the first support member to form a support structure, the support structure passing through an opening in the center section.

7. The drive apparatus of claim 6, wherein the support structure has one or more openings each capable of receiving a fastener for attaching the drive apparatus to the prime mover.

8. A drive apparatus for a vehicle having a prime mover, the drive apparatus comprising:
  a housing forming an internal sump and comprising a main housing member and a housing cover sealed thereto;
  a transmission disposed in the internal sump and comprising:
    a center section containing porting;
    a hydraulic pump disposed on the center section; and
    a first hydraulic motor engaged to and driving a first motor shaft and a second hydraulic motor engaged to and driving a second motor shaft, wherein both hydraulic motors are disposed on the center section and in hydraulic communication with the hydraulic pump through the porting to form a hydraulic circuit;
  a first motor shaft housing joined to the main housing member and enclosing the first motor shaft, and a second motor shaft housing joined to the main housing member and enclosing the second motor shaft; and
  a first steerable hub assembly having a first set of reduction gearing engaged to the first motor shaft and a second steerable hub assembly having a second set of reduction gearing engaged to the second motor shaft, wherein the first set of reduction gearing and the second set of reduction gearing each comprise:
    a pinion gear driven by the respective motor shaft;
    an upper bevel gear drivingly engaged to the pinion gear;
    a gear shaft fixed to and driven by the upper bevel gear;
    a lower gear driven by the gear shaft; and
    a hub gear drivingly engaged to the lower gear.

9. The drive apparatus of claim 8, further comprising:
  a first journal opening formed in the center section, wherein a first end of the first motor shaft is disposed in the first journal opening; and
  a second journal opening formed in the center section, wherein a first end of the second motor shaft is disposed in the second journal opening.

10. The drive apparatus of claim 8, further comprising a first expansion bellows disposed in the first motor shaft housing, wherein the first expansion bellows is in pneumatic communication with a first breather port formed in the main housing member.

11. The drive apparatus of claim 10, further comprising a second expansion bellows disposed in the second motor shaft housing, wherein the second expansion bellows is in pneumatic communication with a second breather port formed in the main housing member.

12. The drive apparatus of claim 10, wherein the first set of reduction gearing and the second set of reduction gearing each further comprise a pivot tube supported in the respective motor shaft housing, wherein each respective gear shaft is rotationally disposed in and extends through its respective pivot tube.

13. A drive apparatus comprising:
  a housing forming an internal sump;
  a transmission disposed in the sump and driving a first motor shaft and a second motor shaft;
  a pinion shaft rotatably mounted on the housing and having a first pinion gear;
  a steering rack rotatably mounted directly on the housing and having a sector gear meshed with the first pinion gear;
  a first steering arm rotatably mounted directly on the housing and connected to the steering rack;
  a second steering arm rotatably mounted directly on the housing and connected to the steering rack;
  a first steerable hub assembly having a first set of reduction gearing engaged to the first motor shaft; and
  a second steerable hub assembly having a second set of reduction gearing engaged to the second motor shaft.

14. The drive apparatus of claim 13, wherein the first set of reduction gearing and the second set of reduction gearing each comprise a motor shaft pinion gear driven by the respective motor shaft, an upper bevel gear drivingly engaged to the motor shaft pinion gear, a gear shaft fixed to and driven by the upper bevel gear, a lower gear driven by the gear shaft, and a hub gear drivingly engaged to the lower gear.

15. The drive apparatus of claim 14, wherein the housing comprises a main housing member, a first motor shaft housing portion and a second motor shaft housing portion, and wherein the first set of reduction gearing and the second set of reduction gearing each further comprise a pivot tube supported in the respective motor shaft housing portion, wherein each respective gear shaft is rotationally disposed in and extends through its respective pivot tube.

16. The drive apparatus of claim 13, wherein the housing comprises a main housing member, a first motor shaft housing portion and a second motor shaft housing portion, and the drive apparatus further comprises a first expansion bellows disposed in the first motor shaft housing portion and a second expansion bellows disposed in the second motor shaft housing portion, wherein the first expansion bellows is in pneumatic communication with a first breather port formed in the housing and the second expansion bellows is in pneumatic communication with a second breather port formed in the housing.

17. The drive apparatus of claim 13, wherein the housing comprises a main housing member, a first motor shaft housing portion and a second motor shaft housing portion, and the first pinion gear and the steering rack are mounted on the main housing member, the first steering arm is mounted on the first motor shaft housing portion and the second steering arm is mounted on the second motor shaft housing portion.

18. The drive apparatus of claim 17, wherein the transmission comprises:
  a center section disposed in the sump, wherein the sump is formed in the main housing member;
  a hydraulic pump disposed on the center section;
  a first hydraulic motor engaged to and driving the first motor shaft and a second hydraulic motor engaged to and driving the second motor shaft, wherein both hydraulic motors are disposed on the center section and in hydraulic communication with the hydraulic pump through a hydraulic circuit formed in the center section, and the first hydraulic motor comprises a cylinder block; and
  a bypass mechanism comprising a bypass actuation shaft rotationally supported in the housing and a U-shaped block lift member engaged to the bypass actuation shaft and extending around a portion of the cylinder block, whereby rotation of the bypass actuation shaft causes the block lift member to engage the cylinder block to lift the cylinder block off its running surface to open the hydraulic circuit to the sump.

19. The drive apparatus of claim 17, wherein the first steering arm is rotatably mounted to the first motor shaft housing portion and the second steering arm is rotatably mounted to the second motor shaft housing portion.

20. The drive apparatus of claim 19, wherein the first motor shaft housing portion and the second motor shaft housing portion are secured to the main housing member by means of fasteners.

21. The drive apparatus of claim 20, wherein the transmission comprises a center section disposed in the sump, a hydraulic pump disposed on the center section, a first hydraulic motor engaged to and driving the first motor shaft and a second hydraulic motor engaged to and driving the second motor shaft, wherein both hydraulic motors are disposed on the center section and in hydraulic communication with the hydraulic pump through hydraulic porting formed in the center section.

22. The drive apparatus of claim 21, further comprising a first expansion bellows disposed in the first motor shaft housing portion and a second expansion bellows disposed in the second motor shaft housing portion, wherein the first expansion bellows is in pneumatic communication with a first breather port formed in the housing and the second expansion bellows is in pneumatic communication with a second breather port formed in the housing.

* * * * *

UNITED STATES PATENT AND TRADEMARK OFFICE
CERTIFICATE OF CORRECTION

PATENT NO. : 9,598,103 B1
APPLICATION NO. : 14/577441
DATED : March 21, 2017
INVENTOR(S) : Thomas J. Lagenfeld et al.

It is certified that error appears in the above-identified patent and that said Letters Patent is hereby corrected as shown below:

In the Specification

Column 6, Line 17, "FIGS. 1" should be changed to --FIGS. 11--.

Signed and Sealed this
Sixteenth Day of May, 2017

Michelle K. Lee
*Director of the United States Patent and Trademark Office*